C. E. LUCKE.
METHOD OF AND APPARATUS FOR MEASURING SUPERFICIAL AREAS.
APPLICATION FILED JUNE 21, 1915.

1,358,086.

Patented Nov. 9, 1920.

C. E. LUCKE.
METHOD OF AND APPARATUS FOR MEASURING SUPERFICIAL AREAS.
APPLICATION FILED JUNE 21, 1915.

1,358,086.

Patented Nov. 9, 1920.
3 SHEETS—SHEET 2.

WITNESSES:

INVENTOR
Charles E. Lucke
BY
Arthur L. Kent
his ATTORNEY

UNITED STATES PATENT OFFICE.

CHARLES E. LUCKE, OF NEW YORK, N. Y.

METHOD OF AND APPARATUS FOR MEASURING SUPERFICIAL AREAS.

1,358,086.  Specification of Letters Patent.  Patented Nov. 9, 1920.

Application filed June 21, 1915. Serial No. 35,262.

*To all whom it may concern:*

Be it known that I, CHARLES E. LUCKE, a citizen of the United States, residing at New York city, in the county of New York and State of New York, have invented certain new and useful Improvements in Methods of and Apparatus for Measuring Superficial Areas, fully described and represented in the following specification and the accompanying drawings, forming a part of the same.

This invention relates to the measurement of superficial, or surface, areas, and comprises a method wherein the surface to be measured is placed against a measuring surface of definite size and of uniform permeability, and the area of the surface to be measured is determined from the change in aggregate permeability of the measuring surface due to the presence thereagainst of the surface to be measured. The invention also comprises an apparatus or machine whereby surfaces may be measured in accordance with my method, and which comprises a supporting surface of uniform permeability against which the surface to be measured may be placed, means for maintaining a difference in pressure of air or other fluid on opposite sides of the measuring surface, and measuring means the indications of which are controlled according to the aggregate permeability of the measuring surface, all as will be hereinafter more fully explained and as claimed.

The object of the invention is especially to provide for the convenient and accurate measurement of the area of surfaces of irregular shape, and the invention has been made especially with the idea of providing for the measurement of hides and other irregular shaped sheets or pieces of leather; but my method and apparatus may of course be used for measuring surfaces of regular shape, and the invention may also be used for measuring surfaces of other substances and materials in sheet or other form to the measurement of which the invention may be found adaptable.

The aggregate permeability of a permeable plate of uniform permeability per unit area is proportional to its area. If air is sucked through such a permeable plate of uniform permeability per unit area, the amount of air flowing through the plate under a given vacuum will depend upon the size or aggregate permeability of the plate, and conversely the vacuum required to maintain a given flow through the plate will also depend upon the size or aggregate permeability of the plate. If a sheet of impervious material, such as a piece of hide or leather, be placed against the outer surface of such a plate of uniform permeability, the aggregate permeability of the plate will be reduced in proportion to the area of the sheet placed thereagainst; and with a plate of definite size, the flow under a given vacuum or the vacuum required to maintain a given flow, will depend upon the size of the sheet placed against the plate, or the area of the uncovered portion of the plate; that is, the flow is a function of the vacuum and the area of the uncovered portion of the plate, or its aggregate permeability with the sheet against it, and the vacuum is a function of the flow and the aggregate permeability of the plate with the sheet against it. The change in aggregate permeability of a permeable supporting plate of definite size and of uniform permeability per unit area when an impervious surface is placed against it, being thus readily measured, furnishes a basis for readily determining the area of surfaces of sheets or other bodies capable of being brought against the supporting or measuring surface of the plate; and this is the foundation of my method.

By causing the flow of air or other fluid through the supporting or measuring plate to be in the direction from the surface against which the surface to be measured is placed, the surface to be measured is automatically drawn and held against the measuring surface by the difference in pressures maintained on the opposite sides of the supporting plate. The pressure difference for causing the flow through the plate may be secured by excess pressure on the side of the plate against which the surface to be measured is placed, but this is inconvenient, and the use of suction means for maintaining a vacuum on the opposite side of the plate is therefore preferred.

The permeable supporting plate may be of any suitable character. The closer the passages through the plate, and for a given aggregate permeability the finer the passages, the more accurate will be the results obtained; but the construction of the plate, size of the passages and relative aggregate cross-sectional area of the passages and of the solid portions of the plate will, however, be governed largely by the uses and conditions for which the apparatus is intended. The surface of the plate may be shaped to conform to the shape of the surface to be measured, but for general use in measuring pieces of hide or leather or other flexible sheets flat or cylindrical surfaces are conveniently employed. If the surface to be measured is inflexible, the measuring surface should be of suitable yielding material so that it may accommodate itself to slight unevennesses in the surface to be measured.

As a full understanding of the invention can best be given by a detailed description of the construction and use of an approved apparatus embodying the apparatus features of the invention and suitable for use in practising my method, such a description will now be given in connection with the accompanying drawings illustrating such an apparatus in several alternative forms. In the accompanying drawings:—

Figures 1, 2:
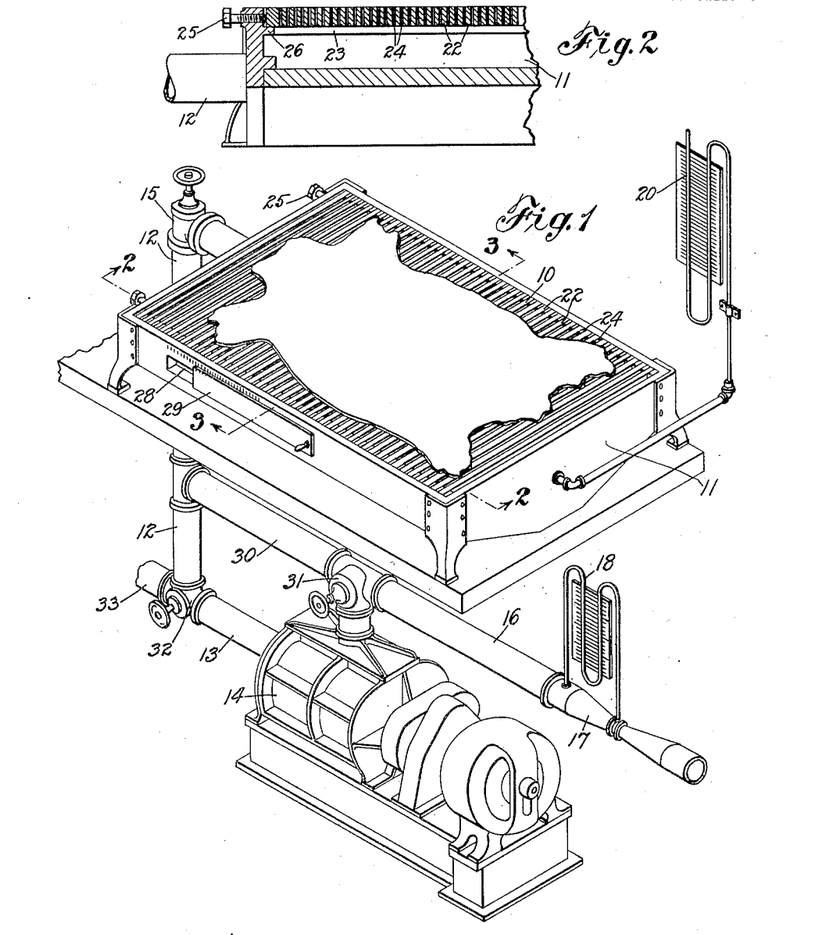
Figure 1 is a perspective view of an apparatus intended especially for the measurement of hide and other large sheets of material of irregular or other shapes.
Fig. 2 is a broken sectional view taken on line 2—2 of Fig. 1, but on an enlarged scale.
Figure 3:
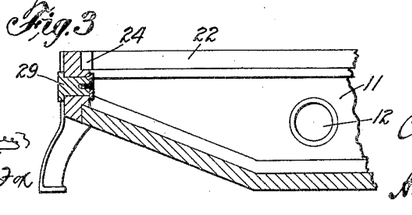
Fig. 3 is a similar view taken on line 3—3 of Fig. 1.

Referring to the drawings, and first to Figs. 1, 2 and 3, the apparatus shown in these figures comprises a flat permeable supporting plate 10 which forms the upper side of a suction box 11 from which a pipe 12 leads to the intake pipe 13 of an exhauster 14. The exhauster may be of any suitable type, but as here shown is a constant speed positive blower and a regulating or adjusting valve 15 is interposed between the suction chamber and the exhauster. The valve 15 would not be necessary with an adjustable or variable capacity exhauster as such an exhauster alone would provide adjustable or regulatable means for exhausting air from the suction chamber. A flow meter is connected with a pipe 16 leading from the discharge of the exhauster; this flow meter being shown as a Venturi meter comprising a Venturi tube 17 and the usual mercury gage 18. The indications of such flow meter will vary according to the rate at which air is exhausted from the suction box, that is, the rate at which air is drawn into the box through the permeable plate 10 or through an adjustable opening hereinafter described. A vacuum gage 20 is connected with the vacuum chamber.

The permeable supporting plate 10, the upper side of which provides the permeable supporting and measuring surface, may be of any suitable material and construction. The apparatus shown in Figs. 1, 2 and 3 is intended for measuring large surface areas such as the surface areas of whole hides, and must, therefore, be of comparatively large size, say, for example, 10 ft. long by 8 ft. wide, and of corresponding and sufficient strength, while at the same time the pores or passages through the plate must for accurate results be of uniform size and closely and uniformly spaced, and they should be sufficiently small so that the aggregate permeability of the plate shall not be so great as to require the use of a blower of undue size. The conditions and requirements are well met by forming the plate as shown of a plurality of thin bars of suitable metal set on edge, or flatwise to each other, and equally spaced apart.

In the apparatus shown, the ends of the bars 22 rest on supporting shoulders provided by flanges 23 extending from opposite sides of the suction box, and the bars are spaced apart by spacing pieces 24 between the ends of adjacent bars, the whole series of bars being pressed tightly together when in place, as by means of clamping screws 25. The end bar against which the screws 25 bear may advantageously be a comparatively thick bar as shown, and a shoulder 26 is provided across the end of the suction box to avoid the presence of an open space at the end of the box. The bars 22 should be as narrow as consistent with the required strength and rigidity, and the openings or slots between the bars should be only a small fraction of the thickness of the bars, as an example, for a permeable plate 8x10 ft. in size the bars may be half an inch thick and two inches deep and spaced one-tenth of an inch apart. In addition to other advantages of forming the permeable plate of spaced bars as shown, this construction has the advantage that the slots or passages may be readily cleaned by simply passing between the bars a clearing piece of suitable thickness, and may be more thoroughly cleaned by removing the bars from the box. The bars in the apparatus shown are obviously readily removable and replaceable.

With the measuring surface of the plate 10 entirely unobstructed, operation of the exhauster 14 will create a partial vacuum in the suction box which will cause an indication by the gage 20, and the air drawn through the plate 10 will be discharged through the pipe 16 causing an indication by the gage 18 of the flow meter. If then something to be measured, such as a hide or piece of leather, be placed on the measuring surface wholly within its limits, the portion of the surface covered by the hide will be closed, that is, the aggregate permeability will be reduced in proportion to the area of the hide, and there will result a new series of readings of the vacuum gage and flow gage, and from such change in the readings of the two gages, or from either one if the adjustment of the exhausting means remains unchanged, the area of the closed portion of the measuring surface, that is, the area of the hide or other thing placed thereon may be determined. If, however, after the hide is placed on the measuring surface, the exhausting means be adjusted to increase the flow (by further opening the valve 15 in the apparatus shown or by speed increase with a variable speed exhauster) until the reading of the flow scale is returned to what it was before the hide was placed, then the vacuum will be increased and the area of the hide may be determined from the reading of the vacuum gage alone; or if the exhausting means be adjusted to reduce the vacuum until the original reading of the vacuum gage is restored, then the area of the hide may be determined from the reading of the gage of the flow meter alone.

The two gages may thus either one alone or both together be marked to read directly in terms of square feet or other unit of surface measurement to show the area of surfaces being measured by first placing on the measuring surface a series of surfaces of known area, provided that the exhaustion is maintained constant. The areas of surfaces of unknown area may then be read in terms of square feet from these empirically calibrated scales, taking them separately or together. The necessity of maintaining constant exhaustion is avoided, however, and greater accuracy and simplicity of reading secured by following the method of adjusting the exhausting means after placing the surface to be measured against the measuring surface to reduce either one of the scale readings to its original value corresponding to the unobstructed measuring surface. In calibrating the scales for this method of operation, both scales may be marked with a zero point for the reading when the measuring surface is entirely unobstructed and with a certain adjustment of the exhausting means. Then the flow scale may be marked for reading in terms of area of surfaces to be measured by placing a series of surfaces of known area on the measuring surface and for each one adjusting the exhausting means to reduce the vacuum scale reading to zero; and similarly the vacuum scale may be marked to read in terms of area of surfaces being measured by adjusting the exhausting means to reduce the reading of the flow scale to zero for each of the series of surfaces of known area placed on the measuring surface. Either or both of the scales might be so marked with experimentally fixed calibrations, and in using the apparatus with either or both of the scales so marked it is only necessary when a hide or other thing is to have its surface measured to place the hide on the measuring surface and then adjust the exhausting means to reduce the vacuum gage to zero reading if the area is to be read from the flow scale, or adjust to reduce the flow gage to zero reading if the area is to be read from the vacuum scale.

The vacuum box of the apparatus shown is also most desirably provided with a variable or regulatable auxiliary opening formed as shown by an opening 28 in one of the sides of the box provided with an adjustable sliding cover 29 and with a scale registering with the opening. This opening will be equivalent in its effect on the vacuum in the vacuum chamber and on the flow through the flow meter of a certain unobstructed superficial area of the permeable plate 10 depending upon the adjustment of the slide 29 and may serve various purposes but is principally valuable in serving to reduce the variations in the readings of the vacuum and flow gages. When used for this purpose, in measuring a hide having an area greater than a certain area the size of the opening is adjusted to correspond in its effect on the vacuum in the vacuum chamber and on the flow through the flow meter to such certain area of the measuring surface so that the vacuum and flow gages then measure only the amount of surface area of the hide in excess of such certain area, and the total surface area of the hide being measured is obtained by adding the area obtained from the gages to such certain area. By making use of the variable opening in this way, the limits of the readings to be taken from the vacuum and flow gages, or from whichever one is used to indicate the area of surfaces being measured, are reduced, thus making it more practical and convenient to use in the apparatus a vacuum gage or a flow gage or both of suitable kind having a magnified or extended scale so that more accurate readings may be obtained. When used in this way, the variable opening may be considered as a means for reducing the range of gage readings, or as a means for reducing the gage readings by an amount equivalent to a certain surface area; and obviously, for this purpose instead of a variable opening such as shown, an opening which may be closed or opened to one definite size may be provided. So also a variable auxiliary opening might be made use of in this way in the apparatus by adjusting it to correspond not only with one certain area of the measuring surface, or of surfaces to be measured, but it might equally well be adjusted for any one of a number of certain areas according to the size of different surfaces being measured.

Among other purposes which may be served by the variable opening 28, the following may be pointed out: With a constant exhaust, the reading from the scale of the variable opening may serve in place of the flow meter reading to indicate the area of a surface being measured when the opening has been adjusted to reduce the reading of the vacuum scale to zero, or may serve in place of the vacuum gage reading to indicate the area of the surface being measured when the opening has been adjusted to reduce the reading of the flow scale to zero, thus avoiding the necessity for the vacuum scale or for the flow meter as the case may be. The scale for the variable opening may be calibrated experimentally in a similar manner as the scales of the vacuum and flow gages.

To provide for the passage of air from the blower 14 to the vacuum chamber for blowing through the permeable plate 10 to clear its passages from dust, etc., a connection is made from the blower discharge by pipe 30 leading into the suction pipe 12, a three-way valve 31 serving to connect the blower discharge with either the pipe 30 or with the discharge pipe 16. A three-way valve 32 is also interposed between the suction pipe 12 and the intake pipe 13 and an intake pipe 33. In normal operation the valves 31 and 32 are adjusted so that air is drawn from the suction chamber and discharged through the pipe 16. When the permeable plate 10 is to be blown out, these valves will be adjusted so that the blower or exhauster will suck air in through the discharge pipe 33 and will intake through the pipes 30 and 12 into the vacuum chamber.

Figure 4:
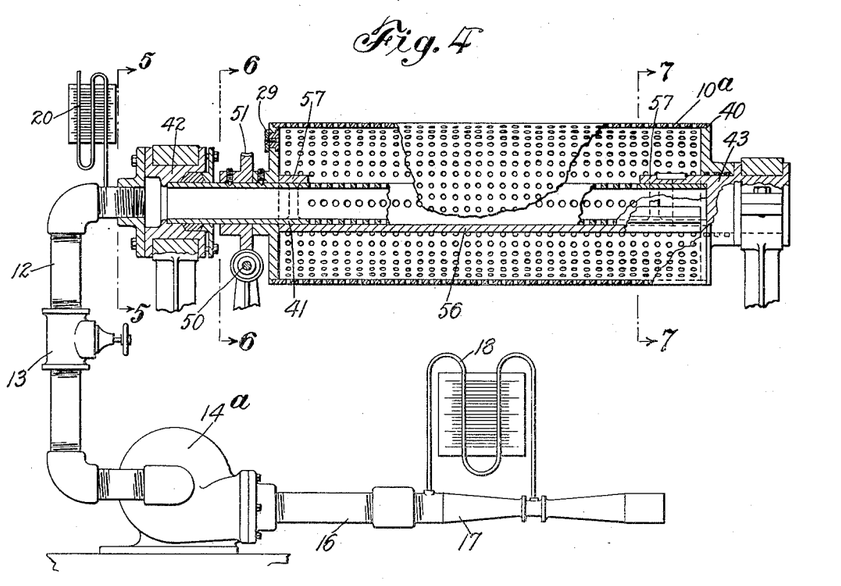
Fig. 4 is a view partly in section and partly in elevation of another form of apparatus.
Figure 5:
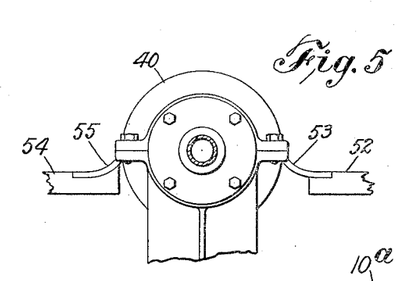
Fig. 5 is an end view taken on line 5—5 of Fig. 4.
Figure 6:
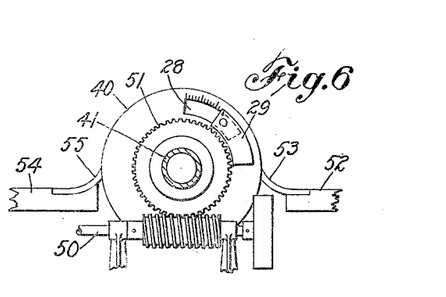
Fig. 6 is a similar view taken on line 6—6 of Fig. 4.

In Figs. 4, 5, 6 and 7, I have illustrated a form of apparatus having a cylindrical permeable measuring surface provided by the peripheral wall of a rotatably mounted cylinder. An apparatus of this form takes up less space than one of the form shown in Figs. 1 to 3 and has other advantages for measuring some kinds of surfaces. As shown in these figures, the permeable supporting plate which provides the measuring surface is formed by the peripheral wall 10$^a$ of a cylinder 40. The ends of the cylinder are closed so that the interior serves as a vacuum chamber, and the cylinder is provided with a hollow shaft 41 which extends out through the cylinder head at one end of the cylinder and is journaled in a suitable bearing 42, a stuffing box serving to make a practically air-tight joint around the shaft. At the other end of the cylinder the cylinder head is journaled on a bearing piece 43, passage of air being prevented by suitable packing rings as indicated, and the end of the hollow shaft 41 extends into and has its bearing within the cored out end of the bearing piece 43. The purpose of this form of bearing will be pointed out hereafter. The portion of the shaft 41 within the cylinder is formed with intake openings, the aggregate size of which should of course be at least equal to and most desirably somewhat greater than the aggregate cross-sectional area of the passages through the plate 10$^a$, or of such portion of the plate 10$^a$ as serves at one time as the measuring surface. The suction pipe 12 connects with the hollow shaft 41 through the bearing 42 and leads to the exhauster 14$^a$, which is here shown as a constant speed exhausting fan blower. As in the case of the apparatus of Figs. 1 to 3, the suction pipe 12 is provided with a regulating valve 15; a vacuum gage 20 is provided for indicating the degree of vacuum in the suction chamber, that is, the interior of the measuring cylinder 40, this gage being shown in Fig. 4 as connected with the intake end of the pipe 12; and for indicating the flow of air into and from the vacuum chamber a flow meter, formed by a Venturi tube 17, provided with a mercury gage 18, is connected with pipe 16 leading from the discharge of the exhauster; and a variable auxiliary opening 28 to the suction chamber is provided in one of the cylinder heads as shown in Figs. 4 and 6.

Figure 7:
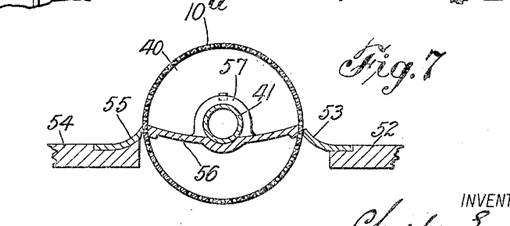
Fig. 7 is a sectional view taken on line 7—7 of Fig. 4.

The cylindrical supporting plate 10$^a$ may be of any suitable character provided it has the necessary uniform permeability and the proper degree of permeability and is of suitable strength. It may be, for example, a perforated metal plate as indicated in Figs. 4 and 7, the perforations being of uniform size and uniformly spaced. As shown in these drawings, the perforations of the plate 10$^a$ are proportionately much too large. The smaller the perforations and the closer they are together the more accurate will be the results obtained in the use of the apparatus; and the smaller the perforations the closer they can be arranged without causing the aggregate permeability of the plate to be so great as to require the use of an exhauster and connections of undue size. But, on the other hand, the smaller the perforations the more apt they are to become more or less clogged and the more difficult they are to keep clear and open to their full capacity, and it is of course necessary for accurate results that the perforations shall be kept clear of dirt and uniformly open. Any suitable means may be provided for turning the cylinder. As shown, the cylinder is turned by means of a shaft 50 which carries a worm meshing with a worm wheel 51 on the hollow shaft 41.

It will usually be more convenient to have the cylinder of such circumferential size as compared to the width of the surfaces to be measured that the sheets to be measured may be fed on to the cylinder from one side thereof as the cylinder is turned, and then after the measurement is completed be fed off from the cylinder at the opposite side by continued rotation. When the machine is to be so used, it is conveniently provided with a feeding table 52 at one side of the cylinder having an up-turned guiding edge 53 to direct the edge of the sheet to the surface of the cylinder, and with a receiving table 54 at the opposite side of the cylinder provided with an up-turned guiding edge 55 which extends close to the surface of the cylinder to strip the measured sheet therefrom and to direct it on to the receiving table. Only the part of the peripheral surface of the cylinder extending above the guiding edges 53 and 55 of the tables will then be used for supporting the surface to be measured, and in order to cut down the aggregate permeability of the peripheral wall of the cylinder, or the plate 10ª, it is desirable to provide means for preventing the passage of air into the suction chamber through the unused portion of the permeable plate. A suitably arranged shield will serve this purpose, and in the drawings I have shown an inner shield or partition plate 56, the side edges of which extend close against the inner surface of the plate 10ª on opposite sides of the cylinder and about on the lines of the edges of the guides 53 and 55, and the ends of which extend close against the inner surface of the cylinder heads. This shield or partition plate is hung on the shaft 41 by collars 57, and the collar 57 at one end is keyed to the bearing sleeve 43 as shown in Fig. 4 to hold the partition plate against rotation with the cylinder.

The apparatus shown in Figs. 4 to 7 may be used in measuring the surface area of flexible sheets in substantially the same way as the apparatus shown in Figs. 1, 2 and 3 is used, except that with this apparatus the sheet may be quickly applied to the measuring surface by simply pushing it along the feed table 52 to bring one edge portion thereof against the surface of the cylinder and then by rotating the cylinder with the exhausting means in operation causing the whole sheet to be applied to the surface of the cylinder, the sheet being suitably manipulated as it is fed on to the cylinder so that it will lie flat and smooth thereagainst. In this way the sheet may be very readily and quickly applied to the measuring surface so as to lie smooth and flat thereon. When the sheet is all on the measuring surface, rotation of the cylinder may be stopped and the reading of the gage or gages taken, the exhausting means being adjusted before reading if this method of using the apparatus is being followed. Then by continued rotation of the cylinder the sheet will be fed off on to the receiving table 54, and the next sheet to be measured may at the same time or thereafter be drawn on to the cylinder and applied to the measuring surface.

Figure 8:
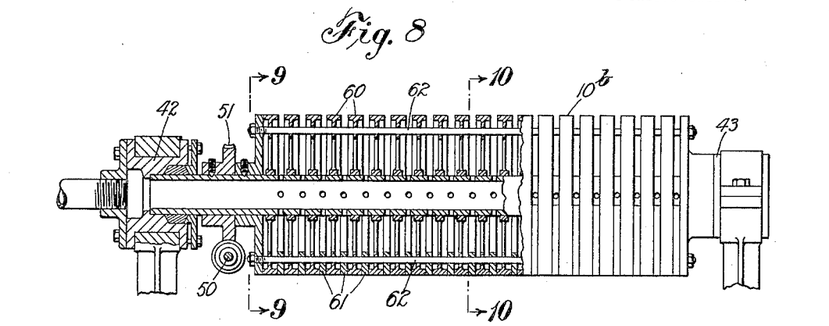
Fig. 8 is a view partly in section and partly in elevation illustrating another form of apparatus.
Figures 9, 10, 11, 12:
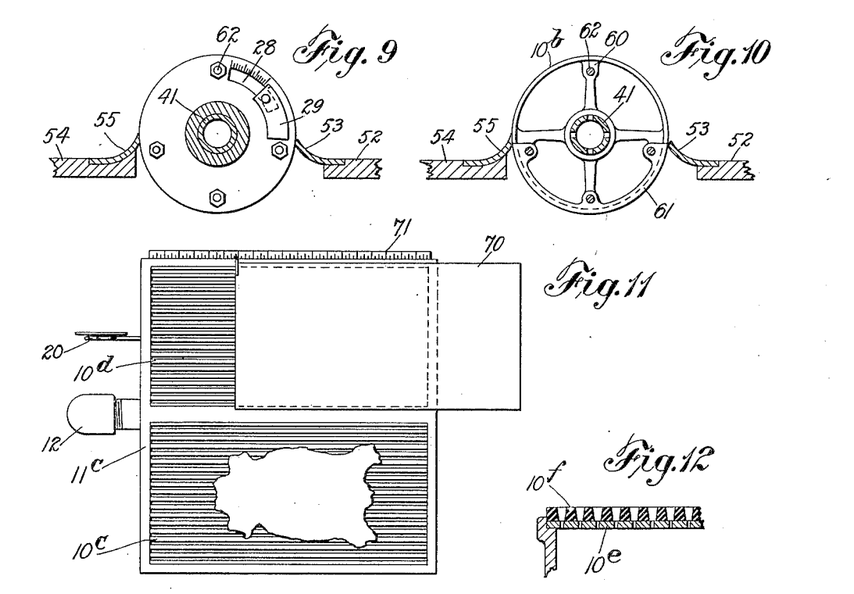
Figs. 9 and 10 are sectional views taken respectively on lines 9—9 and 10—10 of Fig. 8.
Fig. 11 is a plan view of another form of apparatus.
Fig. 12 is a detail sectional view of a portion of a supporting plate or bed having a yielding surface.

Figs. 8, 9 and 10 illustrate a form of cylinder for an apparatus such as shown in Figs. 4 to 7 in which the measuring surface of the cylinder is formed with circumferentially extending slots or passages between spaced annular and comparatively narrow cylinder sections 60. The cylinder sections 60 are formed with spokes and central collars or hubs to fit on the hollow shaft 41, and the sections mounted on the shaft are spaced apart in the construction shown in these figures by peripheral spacing pieces 61, and the cylinder sections, spacing pieces and cylinder heads are drawn together and held by tie bolts 62. The spacing pieces 61 are of circumferential length to extend only part way about the cylinder, leaving open slots between the sections 60 extending the balance of the distance about the circumference of the cylinder. The slots will conveniently be of a circumferential length somewhat greater than one-half the circumference of the cylinder as shown. The width of the slots and the width of the faces of the cylinder sections 60 will be proportionately narrower than shown in Fig. 8, and the slots will be of a width only a small fraction of the width of the sections, as will be understood from what has heretofore been explained. The permeable wall or plate 10ᵇ provided by forming the cylinder of annular sections as shown in these figures is of greater strength than the wall formed of a perforated plate as shown in Figs. 4 to 7, and the construction of these figures is therefore better adapted for large apparatus having a large measuring surface and with which a comparatively high vacuum is employed. The construction also has other advantages as pointed out in connection with the flat bed apparatus of Figs. 1, 2 and 3.

The apparatus of Figs. 8, 9 and 10 may be used in the same way as the apparatus of Figs. 4 to 7, except that as the uniformly permeably measuring surface extends only part way about the cylinder it is necessary that the cylinder shall be in proper position when a sheet to be measured is started to be fed thereon.

A simple form of apparatus suitable more especially for measuring small surfaces is shown in Fig. 11. This apparatus comprises two permeable plates $10^c$ and $10^d$ both of the same uniform permeability and of the same size, these plates each forming part of the walls of a suction box $11^c$, the two plates in the construction shown being placed side by side and each forming part of the top wall of the box. One of the plates, as $10^c$, serves as a supporting or measuring plate to receive the surfaces to be measured, and the other, $10^d$, is provided with an adjustable cover 70 arranged to close the portion of the plate over which it extends; and in conjunction with the cover there is provided a scale 71, the scale being shown as marked on a part carried by the box, and the cover being provided with a pointer to coöperate therewith. The scale will be marked to indicate the area of the uncovered portion of the permeable plate $10^d$ according to the position of the slide 70. In using this apparatus, the exhausting means being in operation and maintaining a constant exhaust, the sheet or other thing the surface of which is to be measured is placed against the surface of the plate $10^c$, and slide 70 is then adjusted to restore the reading of the vacuum gage 20 to what it was with the cover 70 entirely closed and with the plate $10^c$ entirely unobstructed. When the cover 70 has been thus adjusted to restore the reading of the vacuum gage, the area of the exposed portion of the plate $10^d$ will of course be equal to the area of the surface to be measured applied to the plate $10^c$, and this area will be indicated on the scale 71. An advantage of this form of apparatus is that the scale 71 may be marked directly according to the area of exposed portions of the plate $10^d$ with the slide 70 in the various positions. Obviously, the cover 70 might be adjusted according to indications of a flow meter instead of indications of a vacuum gage.

My method and apparatus are obviously adapted for measurement of all kinds of surfaces which may be applied to and which come within the limits of the measuring surface of the apparatus. The method and apparatus are of course especially adapted for measuring the surface area of sheets of material, and especially more or less flexible sheets and sheets which are impervious to the passage therethrough of air under the suction employed in measuring. The degree of suction employed need not be high, but should be sufficient to draw and hold the surface being measured tightly against the measuring surface. The stiffer and more inflexible the sheet being measured, the greater will be the suction which should be used for accurate results. For example, in measuring the areas of heavy hides, a stronger suction is naturally required than in measuring comparatively flexible sheets of soft leather. The degree of suction required is readily determined for any class of sheets or other things the surfaces of which are to be measured. As the indicating device of the apparatus will usually be calibrated empirically, the use of the method and apparatus is not limited strictly to measurement of surfaces of sheets or other things which are entirely impervious to air under the suction employed, it being only necessary that the sheets to be measured shall be substantially less permeable than the measuring surface and that they shall be of approximately uniform permeability, and that the indicating devices of the apparatus used shall be calibrated for the particular sheets to be measured or for sheets of the same permeability as the sheets to be measured.

As above pointed out, it is of course necessary that the contact of the measuring surface with the surface to be measured shall be such as to close against access of air the portion of the measuring surface covered by the surface to be measured. This result is readily secured through the suction due to the partial vacuum in the vacuum chamber when the surface to be measured is possessed of sufficient flexibility to accommodate itself to the measuring surface. But if the surface to be measured is inflexible and not capable of accommodating itself to the measuring surface, then it is desirable to provide the permeable measuring plate with a surface which is yielding to a slight degree sufficient to cause it to accommodate itself to the surface to be measured. For this purpose, the supporting or measuring plate may be formed as illustrated by Fig. 12, in which a perforate supporting plate $10^e$ is provided with a yielding and flexible surface plate $10^f$ having perforations registering with the perforations of the supporting plate $10^e$ and which may be formed of india rubber of a suitable degree of flexibility or of other suitable yielding and flexible material. The perforations of the flexible plate $10^f$ should be of such size relatively to the thickness of the plate that they will not be closed when the plate is compressed, and should best be of outwardly tapered shape as shown.

What is claimed is:

1. The method of measuring surface areas, which consists in placing an object with its surface to be measured against a fluid permeable measuring surface of a definite size and of uniform permeability per unit of area, and determining the area of the surface to be measured from change in the conditions of flow of a fluid through the measuring surface under a difference in pressure on opposite sides of said surface due to the presence against the measuring surface of the surface to be measured.

2. The method of measuring surface areas, which consists in maintaining a partial vacuum on one side of a permeable plate of definite size and uniform permeability per unit area, placing an object with its surface to be measured against the opposite side of said plate, and determining the area of the surface to be measured from the change in aggregate permeability of the plate due to the presence thereagainst of the surface to be measured.

3. The method of measuring surface areas by means of an apparatus which comprises means providing a measuring surface of uniform permeability per unit of area, means for maintaining a difference in pressure of a fluid on opposite sides of said measuring surface, a pressure gage controlled according to the difference in pressure on opposite sides of the measuring surface, and a flow gage controlled according to the flow of said fluid through the measuring surface, which method consists in placing an object with its surface to be measured against the measuring surface, adjusting the difference in pressures on opposite sides of the measuring surface to restore one of said gages to its initial reading, and determining the area of the surface to be measured from the reading of the other gage.

4. Apparatus for measuring surface areas, comprising in combination means providing a permeable measuring surface of uniform permeability per unit of area adapted to have the surface to be measured placed thereagainst, and means for measuring the change in aggregate permeability of said measuring surface due to the presence thereagainst of the surface to be measured.

5. Apparatus for measuring surface areas, comprising in combination means providing a permeable measuring surface of uniform permeability per unit of area adapted to have the surface to be measured placed thereagainst, and means for measuring the change in aggregate permeability of said measuring surface due to the presence thereagainst of the surface to be measured, said measuring means including indicating means for indicating the change in aggregate permeability in terms of surface area of the part of the measuring surface covered by the surface to be measured.

6. Apparatus for measuring surface areas, comprising in combination means providing a permeable measuring surface of uniform permeability per unit of area adapted to have the surface to be measured placed thereagainst, means for maintaining a difference in pressure of a fluid on opposite sides of the measuring surface, and means for determining the area of the surface to be measured from change in the conditions of flow of said fluid through the measuring surface due to the presence thereagainst of the surface to be measured.

7. Apparatus for measuring surface areas, comprising in combination means providing a permeable measuring surface of uniform permeability per unit of area adapted to have the surface to be measured placed thereagainst, means for maintaining a difference in pressure of a fluid on opposite sides of the measuring surface, and flow operated indicating means controlled according to the flow of the fluid through the measuring surface.

8. Apparatus for measuring surface areas, comprising in combination means providing a permeable measuring surface of uniform permeability per unit of area adapted to have the surface to be measured placed thereagainst, means for maintaining a difference in pressure of a fluid on opposite sides of the measuring surface, and means for measuring the loss in aggregate permeability of the measuring surface due to the presence thereagainst of the surface to be measured including a pressure gage controlled according to the difference in pressures on opposite sides of the measuring surface and calibrated to indicate the loss in aggregate permeability in terms of surface area of the part of the measuring surface covered by the surface to be measured.

9. Apparatus for measuring surface areas, comprising in combination means providing a permeable measuring surface of uniform permeability per unit of area adapted to have the surface to be measured placed thereagainst, means for maintaining a difference in pressure of a fluid on opposite sides of the measuring surface, and means for measuring the loss in aggregate permeability of the measuring surface due to the presence thereagainst of the surface to be measured including a flow gage controlled according to the flow of said fluid through the measuring surface and calibrated to indicate the loss in aggregate permeability in terms of surface area of the part of the measuring surface covered by the surface to be measured.

10. Apparatus for measuring surface areas, comprising in combination means providing a permeable measuring surface of uniform permeability per unit of area adapted to have the surface to be measured placed thereagainst, means for maintaining a difference in pressure of a fluid on opposite sides of the measuring surface, and means for measuring the loss in aggregate permeability of the measuring surface due to the presence thereagainst of the surface to be measured including a pressure gage controlled according to the difference in pressures on opposite sides of the measuring surface and a flow gage controlled according to the flow of said fluid through the measuring surface.

11. Apparatus for measuring surface areas, comprising in combination means providing a permeable measuring surface of uniform permeability per unit of area adapted to have the surface to be measured placed thereagainst, adjustable means for maintaining a difference in pressure of a fluid on opposite sides of the measuring surface, and means for measuring the loss in aggregate permeability of the measuring surface due to the presence thereagainst of the surface to be measured including a pressure gage controlled according to the difference in pressures on opposite sides of the measuring surface and a flow gage controlled according to the flow of said fluid through the measuring surface.

12. Apparatus for measuring surface areas, comprising in combination a permeable supporting plate of uniform permeability per unit of area, a suction chamber of which said supporting plate forms a part of the inclosing wall, means for exhausting air from the suction chamber, a vacuum gage controlled by the pressure in the suction chamber, and a flow meter controlled by the air sucked from the suction chamber.

13. Apparatus for measuring surface areas, comprising in combination a permeable supporting plate of uniform permeability per unit of area, a suction chamber of which said supporting plate forms a part of the inclosing wall, means for exhausting air from the suction chamber, and a flow meter controlled by the air sucked from the suction chamber.

14. Apparatus for measuring surface areas, comprising in combination a permeable supporting plate of uniform permeability per unit of area, a suction chamber of which said supporting plate forms a part of the inclosing wall, means for exhausting air from the suction chamber, and a vacuum gage controlled by the pressure in the suction chamber.

15. Apparatus for measuring surface areas, comprising in combination a permeable supporting plate of uniform permeability per unit of area, a suction chamber of which said supporting plate forms a part of the inclosing wall, adjustable means for exhausting air from the suction chamber, a vacuum gage controlled by the pressure in the suction chamber, and a flow meter controlled by the air sucked from the suction chamber.

16. Apparatus for measuring surface areas, comprising in combination a permeable supporting plate of uniform permeability per unit of area, a suction chamber of which said supporting plate forms a part of the inclosing wall, means for exhausting air from the suction chamber, a vacuum gage controlled by the pressure in the suction chamber, a flow meter controlled by the air sucked from the suction chamber, and means providing a variable opening to the suction chamber.

17. Apparatus for measuring surface areas, comprising in combination a permeable supporting plate of uniform permeability per unit of area, a suction chamber of which said supporting plate forms a part of the inclosing wall, means for exhausting air from the suction chamber, a flow meter controlled by the air sucked from the suction chamber, and means providing a variable opening to the suction chamber.

18. Apparatus for measuring surface areas, comprising in combination a permeable supporting plate of uniform permeability per unit of area, a suction chamber of which said supporting plate forms a part of the inclosing wall, means for exhausting air from the suction chamber, a vacuum gage controlled by the pressure in the suction chamber, and means providing a variable opening to the suction chamber.

19. Apparatus for measuring surface areas, comprising in combination a permeable supporting plate of uniform permeability per unit of area, a suction chamber of which said supporting plate forms a part of the inclosing wall, means for exhausting air from the suction chamber, a gage for indicating the conditions of flow of the air through the supporting plate, and means providing a variable opening to the suction chamber whereby when a surface to be measured is placed against the supporting plate the conditions of flow may be adjusted to restore the reading of the gage to its original value so that the adjustment of said opening will indicate the area of the surface being measured.

20. Apparatus for measuring surface areas, comprising in combination a permeable supporting plate of uniform permeability per unit of area, a suction chamber of which said supporting plate forms a part of the inclosing wall, means for exhausting air from the suction chamber, a gage for indicating change in the conditions of flow of air through the supporting plate due to the presence thereagainst of the surface to be measured, and means for reducing the range of the gage reading by an amount equivalent to a certain surface area.

21. Apparatus for measuring suface areas, comprising in combination a permeable supporting plate of uniform permeability per unit of area, a suction chamber of which said supporting plate forms a part of the inclosing wall, means for exhausting air from the suction chamber, a gage for indicating change in the conditions of flow of air through the supporting plate due to the presence thereagainst of the surface to be measured, and means providing a closable auxiliary opening to the suction chamber for reducing the range of the gage readings.

22. Apparatus for measuring surface areas, comprising in combination a permeable supporting plate of uniform permeability per unit of area, a suction chamber of which said supporting plate forms a part of the inclosing wall, means for exhausting air from the suction chamber, a gage for indicating change in the conditions of flow of air through the supporting plate due to the presence thereagainst of the surface to be measured, and means providing a variable opening to the suction chamber provided with a scale.

23. Apparatus for measuring surface areas, comprising in combination a supporting plate having parallel uniformly spaced slots extending therethrough to form a permeable support of uniform permeability per unit of area, a suction chamber of which said supporting plate forms a part of the inclosing wall, means for exhausting air from the suction chamber, and means for determining the area of the surface to be measured from the change in the conditions of flow of air through the permeable supporting plate due to the presence thereagainst of the surface to be measured.

24. Apparatus for measuring surface areas, comprising in combination a permeable supporting plate comprising a plurality of narrow bars of equal width equally spaced apart, a suction chamber of which said supporting plate forms a part of the inclosing wall, means for exhausting air from the suction chamber, and means for determining the area of the surface to be measured from the change in the conditions of flow of air through the permeable supporting plate due to the presence thereagainst of the surface to be measured.

25. Apparatus for measuring surface areas, comprising in combination a permeable supporting plate comprising a plurality of removable relatively thin bars set flatwise to each other, spacing pieces between said bars to provide narrow slots or air passages between the bars and clamping means for pressing the bars and spacing pieces together, and means for determining the area of the surface to be measured from the change in the conditions of flow of air through the permeable supporting plate due to the presence thereagainst of the surface to be measured.

26. Apparatus for measuring surface areas, comprising in combination a permeable supporting plate having a plane supporting surface comprising a plurality of thin straight bars of metal set on edge flatwise to each other and equally spaced apart, a suction chamber of which said supporting plate forms a part of the inclosing wall, means for exhausting air from the suction chamber, and means for determining the area of the surface to be measured from the change in the conditions of flow of air through the permeable supporting plate due to the presence thereagainst of the surface to be measured.

27. Apparatus for measuring surface areas, comprising in combination a permeable support having a yielding and flexible surface adapted to accommodate itself to slight unevennesses in the surface to be measured, means for maintaining a difference in pressure of a fluid on opposite sides of the measuring surface, and indicating means controlled according to the conditions of flow of the fluid through the permeable support.

28. Apparatus for measuring surface areas, comprising in combination a permeable support having a surface portion of yielding and flexible material formed with outwardly flaring openings therethrough, means for maintaining a difference in pressure of a fluid on opposite sides of the measuring surface, and indicating means controlled according to the conditions of flow of the fluid through the permeable support.

29. Apparatus for measuring surface areas, comprising in combination a permeable supporting plate of uniform permeability per unit of area, a suction chamber of which the supporting plate forms a part of the inclosing wall, an exhauster connected to the suction box, a suction regulating valve between the exhauster and the suction box, and means for indicating the conditions of flow of air through the supporting surface.

30. Apparatus for measuring surface areas, comprising in combination a permeable supporting plate, a suction chamber of which said supporting plate forms a part of the inclosing wall, means for exhausting air from the suction chamber, and means for reversing the air current through the permeable plate.

In testimony whereof I have hereunto set my hand in the presence of two subscribing witnesses.

CHARLES E. LUCKE.

Witnesses:
  H. L. KENT,
  PAUL H. FRANKE.